May 10, 1960 J. R. ANDERSON 2,936,380

LIGHT VALVE LOGIC CIRCUITS

Filed Dec. 7, 1955 5 Sheets-Sheet 1

INVENTOR
J. R. ANDERSON
BY [signature]
ATTORNEY

LIGHT VALVE LOGIC CIRCUITS

Filed Dec. 7, 1955 5 Sheets-Sheet 2

INVENTOR
J. R. ANDERSON
BY [signature]
ATTORNEY

INVENTOR
J. R. ANDERSON
BY James W. Falk
ATTORNEY

INVENTOR
J. R. ANDERSON
BY James W. Falk
ATTORNEY

LIGHT VALVE LOGIC CIRCUITS

Filed Dec. 7, 1955 5 Sheets-Sheet 5

INVENTOR
J. R. ANDERSON
BY James W. Falk
ATTORNEY 2,936,380

LIGHT VALVE LOGIC CIRCUITS

John R. Anderson, Berkeley Heights, N.J., assignor to Bell Telephone Laboratories, Incorporated, New York, N.Y., a corporation of New York Application December 7, 1955, Serial No. 551,608

8 Claims. (Cl. 250—225)

This invention relates to logic systems and, more particularly, to such systems employing light valves or light gates.

Various types of light gates are well known in the art. Generally, in such gates, the characteristics of a beam of light are altered on passage through the light gate under control of an independently applied electrical signal. Thus, the state of polarization of the light may be selectively altered on passage through the light gate by changing the optical properties of the light gate under control of the electrical signal. Such light gates might include certain piezoelectric crystals, Kerr cells, and other devices. Ferro-electric capacitors may also be employed as light gates.

In accordance with aspects of this invention, combinations of light gates may be employed to perform the functions of logic circuits such as AND, OR and INHIBIT logic. While various types of light gates may be employed to accomplish these logic functions, space requirements and power consumption are often critical factors in determining what particular type of circuit is to be employed in connection with large computers. Advantageously, ferroelectric crystal light gates may be employed in these logic systems, for these light gates occupy a minimum space and no power is consumed from the electrical circuit of the crystal to determine its logic condition. The absence of this power consumption results from the fact that the optical condition of the crystal indicates the logic condition of the system, and these conditions are determined by projecting light upon the crystals and determining, by means of a detecting device, the optical condition of the crystals. Ferroelectric capacitors, including crystals, having two or more electrodes on their surfaces exhibit one or more of six optical phenomena and thus may be utilized as light gates in a logic system.

The first phenomenon may be termed strain induced birefringence. To utilize this effect, the electric field is applied to the ferroelectric crystal parallel to the *c* axis, that is, the light axis of the crystal, and light is directed upon the crystal in a direction parallel to the *c* axis through semitransparent electrodes on the crystal. If this light is polarized, it will be rotated by the capacitor and will pass through an analyzer rotated 90 degrees with respect to the polarizer only when the field is applied to the crystal. If the field is constant, then the light will be continuously transmitted through the light gate, which includes the polarizer, capacitor and analyzer. However, if pulses of short duration are applied to the capacitor of such polarity and only sufficient magnitude to reverse the C domains of the crystal, the capacitor will rotate light during the reversal of the domains but will not rotate light after the reversal is completed. This second phenomenon might be called switching strain induced birefringence as is more completely explained and described in my application Serial No. 501,309, filed April 14, 1955.

A third phenomenon may be termed domain switching or rotation. To cause polarized light rotation through the light gate, thus turning it on, the electric field is applied perpendicular to the *c* axis; but the field is applied parallel to the *c* axis to effectively turn the light gate off. In this instance, the light is directed upon the crystal in a direction parallel to the *c* axis. This phenomenon is referred to as domain switching because a C domain is rotated 90 degrees to become an A or a B domain or vice versa. The crystal rotates polarized light when the perpendicular field is applied to turn the gate on. If no perpendicular field is applied, no rotation of polarized light takes place and the light gate is said to be in the Off condition.

The last three phenomena relating to ferroelectric light gates are those commonly known as the electro-optical phenomena and will be discussed together. These phenomena may be further divided into the transverse and longitudinal electro-optical effects. The transverse electro-optical effect may be still further subdivided into a first and a second transverse electro-optical effect. The first transverse electro-optical effect is produced by applying the electric field parallel to the *c* axis and projecting the polarized light parallel to the *a* or *b* axis, which light is therefore perpendicular to the *c* axis. The polarized light is rotated when no field is applied and further rotated when the field is applied. The second transverse electro-optical effect is achieved by applying the electric field perpendicular to the *c* axis of the crystal and projecting light upon the crystal parallel to the *c* axis. The longitudinal electro-optical effect is achieved by applying the electric field perpendicular to the *c* axis of the crystal and projecting polarized light upon the crystal perpendicular to the *c* axis. In the second transverse electro-optical effect, the polarized light is rotated when the field is applied while no rotation takes place when no field is applied. In the longitudinal electro-optical effect, polarized light is rotated when no field is applied and further rotated when the field is applied. This last-mentioned phenomenon is not to be confused, however, with domain switching or rotation in which the actual domains of the crystal are rotated.

For the sake of simplicity, the different types of phenomena associated with crystal light gates have been tabulated below with the different combinations of directions of applied field, incident light and crystal alignment. Two of these phenomena render themselves readily adaptable to use in logic circuits. These two phenomena are the strain induced birefringence and the transverse electro-optical effects. Crystals employing the second transverse and strain induced birefringence phenomena are relatively insensitive to temperature changes making them more desirable for certain applications.

In connection with the first transverse electro-optical effect and the longitudinal electro-optical effect, if a ferroelectric capacitor is chosen which produces a quarter-wave delay or rotation and a ferroelectric crystal is inserted in optical series with the capacitor, which crystal also produces a quarter-wave delay and is oriented to cancel the rotation of the capacitor, then effectively no rotation takes place until a field is applied to the capacitor. Since no field is to be applied to the ferroelectric crystal, this combination effectively provides for temperature compensation in that temperature changes cause a change in the rotation of polarized light in the capacitor while the change will be equal in magnitude and opposite in direction in the ferroelectric crystal. After the light passes through the ferroelectric capacitors, it is no longer polarized in a single plane but is elliptically or in some cases circularly polarized. If this light, which is elliptically or circularly polarized, is intercepted by an analyzer, a small portion of the light passes through the analyzer, even though the analyzer is oriented at 90 degrees with respect to the major portion of the light.

If an extensive optical system is employed and a number of ferroelectric crystals are placed in optical series with respect to the light source, and analyzers are placed in the light path after each of the ferroelectric capacitors and these analyzers are alternately oriented 90 degrees with respect to each other, then a situation exists in which practically no light passes through the optical system until each of the light gates is actuated. Therefore, for optimum results, analyzers are employed with each ferroelectric capacitor in a serially arranged optical sytem. Advantageously, the quarter-wave plates may consist of ferroelectric crystals having no electrical connections with the logic system. These crystals may be quarter-wave plates which are oriented in such a manner to delay light passing through the crystal in a direction opposite to that of the crystals of the ferroelectric capacitor. In such instance, the ferroelectric crystals would effectively form temperature compensating devices for the ferroelectric capacitors in that changes in the ambient temperature of the crystals of the capacitor cause a change in the rotation of the polarized light while this same change in temperature would cause a compensating change in the rotation of the light through the ferroelectric crystal and thus maintain the combined light properties constant under changing temperature conditions.

The various phenomena discribed above are tabulated below to facilitate a comparison between them.

*Table of ferroelectric optical phenomena*

I. Strain induced birefringence
   1. Electric field: parallel to light axis (*c* axis).
   2. Incident light: through semitransparent electrodes, parallel to *c*.
   3. Polarizer-analyzer orientation: 90 degrees.
   4. Optical effect: polarized light rotated when field is applied; when field is removed, no rotation of polarized light.

II. Domain reversal strain induced birefringence
   1. Electric field: parallel *c* axis to reverse C domains.
   2. Incident light: through semitransparent electrodes, parallel to *c*.
   3. Polarizer-analyzer orientation: 90 degrees.
   4. Optical effect: polarized light rotated only during C domain (180 degrees) reversal.

III. First transverse electro-optical effect
   1. Electric field: parallel to *c* axis.
   2. Incident light: parallel to *a* or *b* axis and perpendicular to *c* axis.
   3. Polarizer-analyzer orientation: 90 degrees, crystal *c* axis approximately 45 degrees with respect to both polarizer and analyzer.
   4. Optical effect: polarized light rotated with no field applied, further rotated when field applied.

IV. Second transverse electro-optical effect
   1. Electric field: perpendicular to *c* axis.
   2. Incident light: parallel to *c* axis.
   3. Polarizer-analyzer orientation: 90 degrees.
   4. Optical effect: polarized light rotated when field is applied, no rotation when field is removed.

V. Longitudinal electro-optical effect
   1. Electric field: perpendicular to *c* axis (higher voltage than transverse required).
   2. Incident light: perpendicular to *c* axis and parallel to *a* or *b* axis (transparent electrodes).
   3. Polarizer-analyzer orientation: 90 degrees, crystal *c* axis approximately 45 degrees with respect to both polarizer and analyzer.
   4. Optical effect: polarized light rotated when no field is applied, further rotated when field is applied.

VI. Domain rotation
   1. Electric field: perpendicular to *c* axis to turn on, parallel to *c* to turn off (displaced electrodes may be used).
   2. Incident light: parallel to *c* axis.
   3. Polarizer-analyzer orientation: 90 degrees, crystal *c* axis with domains rotated for On condition approximately 45 degrees with respect to both polarizer and analyzer.
   4. Optical effect: no rotation of polarized light in the Off condition, polarized light rotated when field is applied to turn on.

Accordingly, it is an object of this invention to provide improved logic systems.

Another object of this invention is to provide high speed logic systems using solid state devices as light gates.

It is a further object of this invention to provide logic systems capable of operating with low power consumption at high speeds.

It is a still further object of this invention to provide logic systems having fewer electrical connections as well as entirely independent inputs and outputs.

Briefly, in specific illustrative embodiments of this invention, ferroelectric crystals are employed in light gates or switches in logic systems and so arranged and connected in electrical circuits that their optical properties are under the control of the electrical circuit. Advantageously, the determination of the quiescent condition of the crystal relative to the incident light beam is used to determine the output of the logic system.

Each ferroelectric crystal or capacitor is capable of rotating the direction of polarization of incident light; and each ferroelectric capacitor together with a polarized light analyzer can define a light gate element which will transmit light only if the direction of polarization of the incident light, as modified or not by the ferroelectric crystal, is such that the light will be transmitted through the analyzer. Accordingly, in discussing various embodiments of this invention employing different electro-optical effects and utilizing light gates in different logic systems, it will sometimes be advantageous to consider only the crystal or ferroelectric capacitor itself, in which case it is necessary to discuss rotation of direction of polarization, and at other times it will be advantageous to consider the light gate elements, in which latter case it is proper to discuss the transmission or nontransmission of light.

It is a feature of this invention that the quiescent condition of a logic system be determined by projecting light upon electro-optical elements of the system.

It is another feature of this invention that ferro-electric elements be employed in a logic system wherein the optical properties of these elements are controlled by electrical circuits.

It is another feature of this invention to utilize an electrical input selectively to control the direction of polarization of light transmitted through the ferroelectric elements of the circuit and an independent optical output to determine the logic condition of the circuit.

It is still another feature of this invention to utilize a plurality of ferroelectric capacitors having fixed potentials applied to their electrodes, which potentials are such as to maintain some of the crystals in condition normally to rotate the direction of polarization of the light.

It is still another feature of this invention to utilize the output signal of the light detector of a ferroelectric logic system to control the light rotation of one of the ferroelectric capacitors.

It is still another feature of this invention to utilize a combination of a ferroelectric capacitor and a quarter-wave plate of ferroelectric material to provide positive operation of the light gate including this capacitor and to compensate for changes in the optical properties of the capacitor due to changes in the ambient temperature.

It is a still further feature of this invention to place two or more ferroelectric crystals in optical series with regard to one light source and to place these crystals in optical parallel with regard to another light source and, by separately detecting the polarization of the light from each light source, provide plural independent logic outputs.

It is a further feature of this invention to utilize a combination of series and parallel aligned crystals with regard to incident light thereby to form a more complex logic circuit.

A complete understanding of this invention and of these and various other features thereof may be gained from consideration of the following detailed description and the accompanying drawing in which.

Figure 1A:
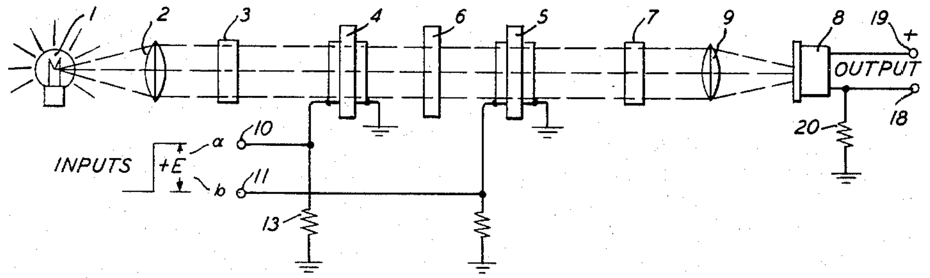
Figs. 1A and 1B are combined pictorial and schematic representations illustrative of specific embodiments of AND logic systems in accordance with this invention.

Turning now to Fig. 1A of the drawing, there is depicted an AND logic system, in accordance with one specific embodiment of this invention, wherein light source 1 produces a light beam which passes through lens 2 and polarizer 3 and impinges on ferroelectric capacitor 4. Each of ferroelectric capacitors 4 and 5 includes transparent electrodes on each surface of the crystal perpendicular to the incident light. Polarizer 6 is placed at an angle of 90 degrees with respect to the polarizer 3 while analyzer 7 is oriented parallel to polarizer 3. A photocell or light detecting device 8 is aligned with analyzer 7 behind lens 9. Input terminal 10 is connected to one electrode of ferroelectric capacitor 4, and resistor 13 is connectetd between ground or a source of reference potential and terminal 10. Similar connections are made to capacitor 5. A source of positive potential is connected to the photocell terminal 19, and an output terminal 18 is connected to photocell or light detector 8. Output load resistor 20 is connected between output terminal 18 and ground and delivers a signal indicative of light transmitted to the detecting device. Each crystal of ferroelectric capacitors 4 and 5 is a C domain crystal, that is, the C domains of the crystals are parallel to the incident light.

Utilizing the aforementioned principles of strain induced birefringence, ferroelectric capacitor 4 normally will not rotate polarized light such that it will be transmitted through polarizer 6. However, if a potential is applied to terminal 10 of ferroelectric capacitor 4 and this potential is sufficient to produce birefringence, capacitor 4 will rotate the polarized light and thus cause it to be transmitted through polarizer 6. If a similar potential is applied to terminal 11, ferroelectric capacitor 5 undergoes strain induced birefringence and similarly rotates the light. Thus, each of the serially aligned crystals must rotate light in order for the light to reach photocell 8. If suitable potentials are applied simultaneously to terminals 10 and 11, light from source 1 reaches photocell 8. In response to this light, the photocell develops an output signal across output load 20, which signal is available at terminal 18.

Figure 1B:
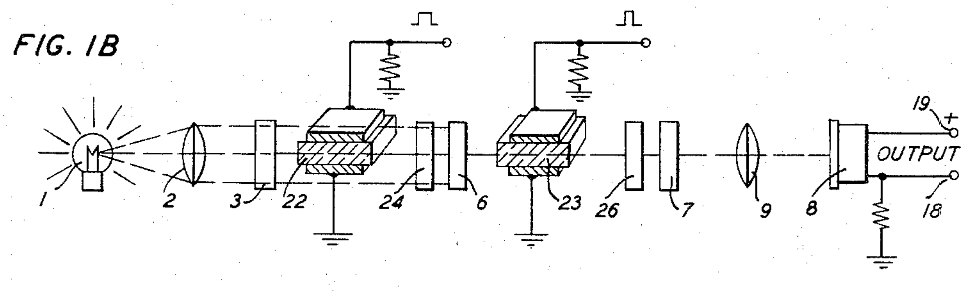

One difficulty with electro-optic AND gates utilizing crystals having incident light parallel to any axis other than the *c* axis is that some light will be transmitted through any part of the gates operated, even though substantially complete transmission occurs only when both gates are actuated. This partial transmission is due to the elliptical or circular polarization of the light, which polarization is produced by the ferroelectric capacitors as explained above. The arrangement shown in Fig. 1B provides complete blocking of the light except when all sections of the AND gate are activated. The arrangement utilizes the second transverse electro-optical effect and includes lens 2, polarizer 3, capacitor 22, a quarter-wave plate 24, polarizer 6, capacitor 23, a second quarter-wave plate 26, and second analyzer 7 interposed in that order between light source 1 and photocell 8. If quarter-wave plates 24 and 26 are of the same light path length as capacitors 22 and 23, respectively, the quarter-wave plates when oriented at right angles with respect to the optical axes of the capacitors will act to compensate the optical effects of temperature changes in the capacitors. This assumes, of course, that both capacitors and both quarter-wave plates are composed of the same material and all have the same ambient temperature. If the thickness of these quarter-wave plates were increased to half-wave plates, then the combined light gates would normally transmit light and the application of pulses to either of the input terminals would cause the light gates, including these capacitors, to become opaque. Each polarizer and analyzer is oriented at 90 degrees with respect to the immediately previous polarizer while each ferroelectric capacitor is oriented approximately 45 degrees with respect to the immediately preceding polarizer and at 45 degrees with respect to the subsequent polarizer or analyzer. The light is projected on the ferroelectric crystals in a direction normal to the *a* axis. Light passes through the first stage or light gate, including polarizer 6, when an input voltage is applied to the first capacitor. Light also passes through the second stage or light gate, including analyzer 7, when a voltage is applied to the second capacitor. Thus, voltages must be applied to both capacitors simultaneously for the light to reach the photocell. If a bias is applied to the second capacitor to maintain that stage or light gate in a normally transmitting condition, a pulse may be applied to this second capacitor to turn off this stage, thus making it an inhibiting gate.

Figure 2A:
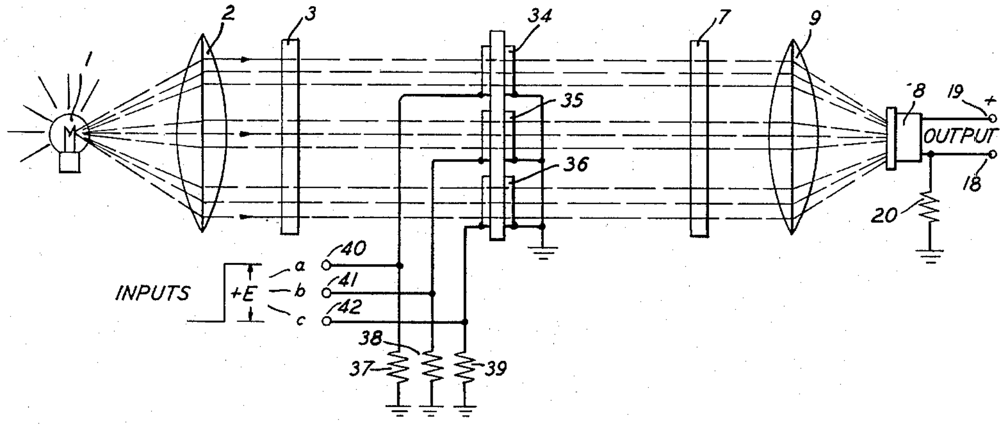
Figs. 2A and 2B are combined pictorial and schematic representations illustrative of specific embodiments of OR logic systems in accordance with this invention.

Fig. 2A depicts an optical OR logic system in accordance with another specific embodiment of this invention, utilizing the phenomenon of strain induced birefringence. Ferroelectric capacitors 34, 35 and 36 are in parallel with respect to the incident light from source 1. One electrode of each of these capacitors is connected directly to ground and the complementary electrodes are connected through individual load resistors 37, 38 and 39 to ground. Since no potential is normally applied to the capacitors and the C domains are oriented in a direction parallel to the incident light beams, the light gates including the capacitors and analyzer are normally opaque. If, however, a positive pulse is applied to any one of terminals 40, 41 or 42, light will be transmitted through a portion of the light gate including the capacitor connected to that terminal. This light is rotated by the selected capacitor and passes through the analyzer which is oriented at approximately 90 degrees with respect to the polarizer. The photocell will now deliver an output signal to terminal 18 indicating that at least one portion of the light gate is in a transmitting condition.

Figure 2B:
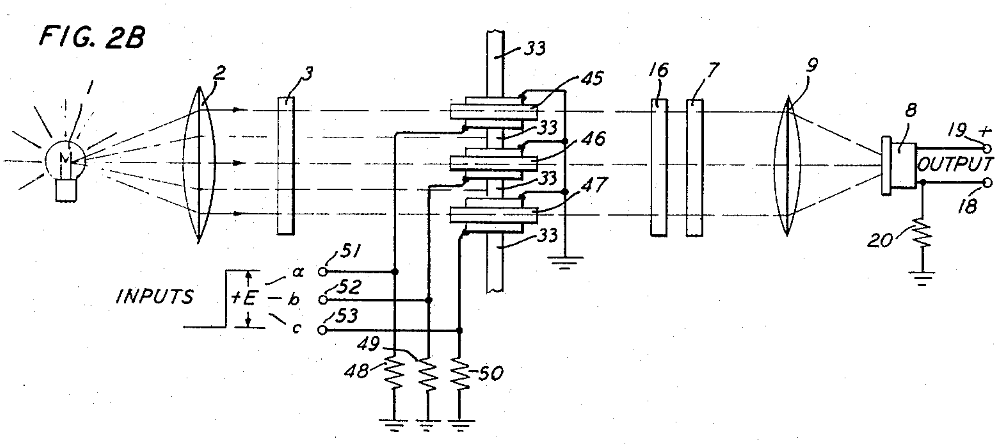

Fig. 2B depicts an OR logic circuit, in accordance with another specific embodiment of this invention, utilizing the first transverse electro-optical effect in which the C domains are oriented in a direction perpendicular to the electrodes of ferroelectric capacitors 45, 46 and 47 and, thus, the *c* axis is parallel to the electric field. The polarizer 3 and analyzer 7 in this embodiment are also oriented at 90 degrees, and quarter-wave plate 16 is interposed between the capacitors and the analyzer to insure that none of the elliptically polarized light rays reach the photocell. A reference potential is connected to one electrode of each of the capacitors, and the complementary electrodes of these capacitors are connected to ground through individual resistors 48, 49 and 50. If a positive potential is applied to one of terminals 51, 52 or 53, the associated capacitor will rotate the light causing the light to pass through analyzer 7 to the photocell 8. Incident light on photocell 8 causes an OR output signal to be delivered to terminal 18. This is therefore another example of an OR logic system having an output signal dependent upon any one of a plurality of inputs.

Figure 3A:
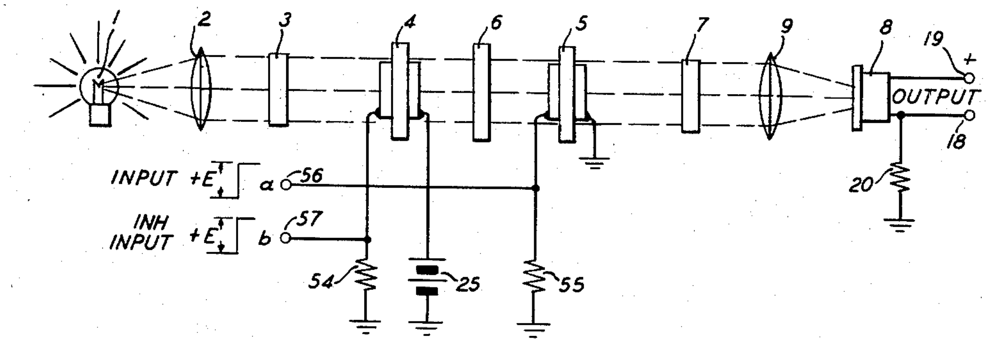
Figs. 3A and 3B are combined pictorial and schematic representations illustrative of specific embodiments of INHIBIT logic systems in accordance with this invention.

Fig. 3A depicts an INHIBIT logic circuit in accordance with another specific embodiment of this invention wherein light source 1 projects light through lens 2 and polarizer 3 to the crystals of ferroelectric capacitors 4 and 5. Connected to one terminal of ferroelectric capacitor 4 is a source 25 of positive potential. The other electrode of capacitor 4 is connected through input load resistor 54 to ground or a source of reference potential. Ferroelectric capacitor 5 and polarizer 6 are aligned, with respect to the light beam, between capacitor 4 and analyzer 7. Polarizer 3 and analyzer 7 are oriented in the same plane while polarizer 6 is oriented 90 degrees with respect to this plane. One of the electrodes of ferroelectric capacitor 5 is connected directly to ground or a source of reference potential while the other electrode is connected through load resistor 55 to ground or a source of reference potential. Each of the crystals of ferroelectric capacitors 4 and 5 has its C domain oriented in a direction parallel to the incident light. The application of potential to one electrode of ferroelectric capacitor 4 maintains this portion of the light gate in a normally transmitting condition with respect to the incident light, while capacitor 5, having no potential applied to its electrodes, maintains this portion of the light gate normally opaque. If a pulse is applied to input terminal 56 causing light to be rotated by capacitor 5, this light will impinge upon photocell 8 and an output pulse will be delivered to output terminal 18. If, however, at the same time that this pulse is applied to terminal 56 an inhibit pulse of positive polarity is applied to terminal 57, that stage of the light gate, including capacitor 4, will be rendered opaque and no light will reach photocell 8. It is understood that reversing the order of the ferroelectric capacitors will not affect the operation of the light gate.

Figure 3B:
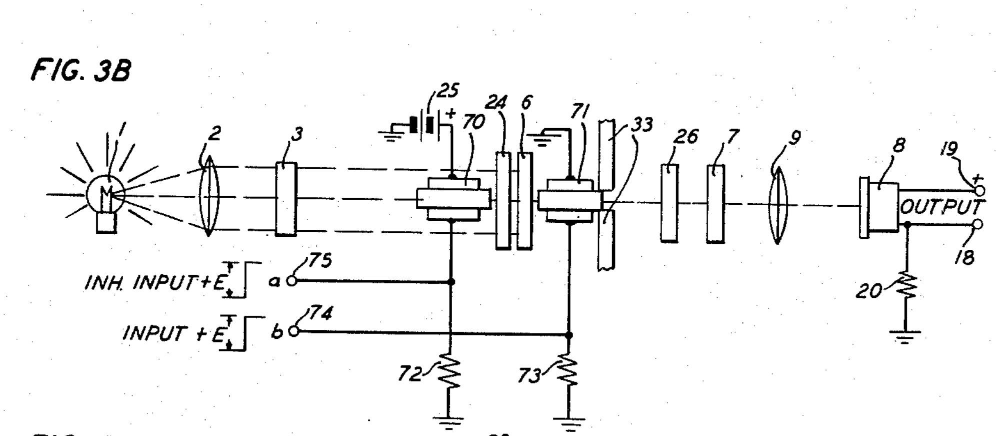

Fig. 3B depicts another INHIBIT circuit in accordance with a specific embodiment of this invention in which the longitudinal electro-optical effect is employed. This light gate system includes light source 1, lens 2, polarizer 3, capacitor 70, quarter-wave plate 24, polarizer 6, capacitor 71, quarter-wave plate 26, analyzer 7, lens 9 and photocell 8 optically aligned in that order. The combination of quarter-wave plates and analyzers prevents any light from passing through either stage of the light gate unless the light is rotated by the capacitor of that stage. Both the incident light and the applied field of ferroelectric capacitors 70 and 71 are perpendicular to the *c* axis. A positive potential from source 25 is applied to one electrode of ferroelectric capacitor 70 and the other electrode is connected to ground through resistor 72. One electrode of ferroelectric capacitor 71 is connected directly to ground while the other electrode is connected to ground through input load resistor 73. Under these conditions, that portion of the light gate including ferroelectric capacitor 71 is normally opaque while that portion of the light gate including ferroelectric capacitor 70 is in a condition normally to transmit light. If a pulse is applied to input terminal 74, light will be rotated by capacitor 71 and therefore will pass through analyzer 7 to photocell 8. If, however, an inhibit pulse is applied to terminal 75, capacitor 70 will not rotate the incident light and no output will be derived at terminal 18, regardless of the input signal applied to terminal 74.

The quarter-wave plates are not required in combination with capacitors when the incident light is parallel to the *c* axis. The light axis of these crystals does not normally produce any delay or rotation of the light and the polarizer-analyzer orientation of 90 degrees is sufficient to prevent the passage of any light through the gate.

Figure 4:
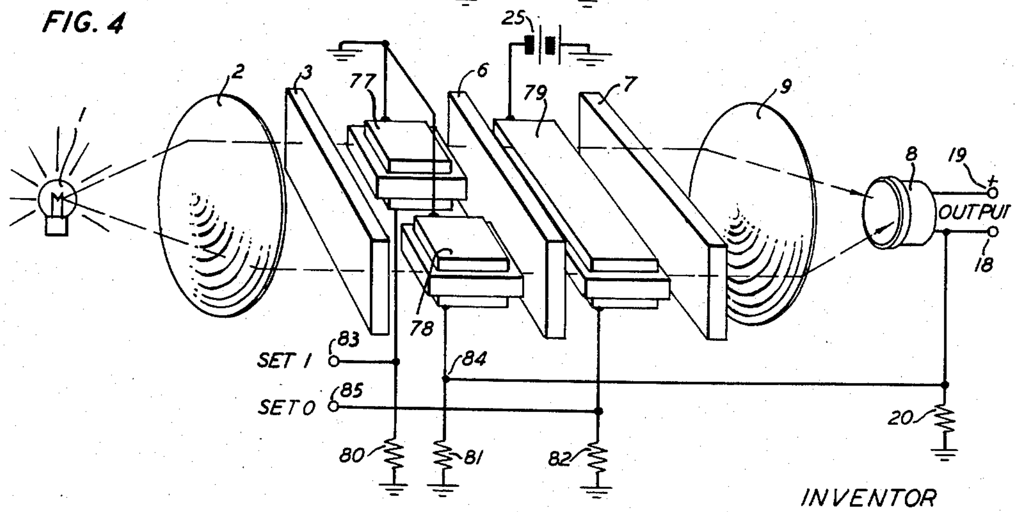
Fig. 4 is a combined pictorial and schematic representation illustrative of specific embodiments of a flip-flop system in accordance with this invention.

With an understanding of the principles involved in these logic "building blocks," it is possible to construct a large variety of computers and logic systems of the type already well known in the art. One example of such a system is the bistable flip-flop or memory cell as depicted in Fig. 4. As herein depicted, ferroelectric capacitors 77 and 78 are placed optically parallel with regard to the incident light from source 1, which light is directed through lens 2 and polarizer 3. Ferroelectric capacitor 79 and polarizer 6 are aligned in optical series with both ferroelectric capacitors 77 and 78 in that capacitor 79 and polarizer 6 are wide enough to intercept the path of light passing through both of capacitors 77 and 78. Polarizer 6 is at an angle of 90 degrees with respect to polarizer 3. A positive bias is applied to one electrode of ferroelectric capacitor 79 from source 25, while the other electrode is connected to ground through resistor 82. One electrode of each of ferroelectric capacitors 77 and 78 is connected directly to ground while the complementary electrode is connected to ground through resistors 80 and 81, respectively.

The fixed bias applied to capacitor 79 maintains that portion of the light gate, including this capacitor, in a condition normally to rotate the direction of light applied to it so that the light will be transmitted through analyzer 7 to detector 8, analyzer 8 being positioned at 90 degrees to polarizer 6. Ferroelectric capacitors 77 and 78 will normally not rotate the polarization of light applied thereto as no bias is applied to their electrodes so that the light gates including these capacitors and polarizer 6 normally will not transmit light. If an input signal is applied to terminal 83, that section of the light gate including capacitor 77 and polarizer 6 will transmit light, which light will be rotated by ferroelectric capacitor 79 and therefore will pass through analyzer 7 to photocell 8. As a result of this incident light on photocell 8, an output signal will be delivered to terminal 18, which signal will be fed back to terminal 84. This signal applied to ferroelectric capacitor 78 maintains that portion of the light gate including capacitor 78 and polarizer 6 in a light transmitting condition. When the signal applied to terminal 83 is removed the portion of the light gate, including ferroelectric capacitor 77 and polarizer 6, returns to its normal or nontransmitting condition. Capacitor 78 is maintained in its light rotating condition by the signal fed back from the photocell in response to the light through capacitors 78 and 79. If a signal is now applied to terminal 85, the bias is overcome and ferroelectric capacitor 79 will no longer rotate the light, thereby interrupting the beam of light to photocell 8. Interruption of the light beam causes the feedback signal delivered to terminal 84 to be discontinued, thus restoring that portion of the light gate, including ferroelectric capacitor 78 and polarizer 6, to its nontransmitting condition. This condition prevails until a subsequent signal is applied to terminal 83. Thus, the logic system possesses two stable states, which states are under the control of signals applied to terminals 83 and 85. The signal applied to terminal 83 causes the light gate system to assume its transmitting condition while the signal applied to terminal 85 causes the system to assume its nontransmitting condition. Light shields 33 may be employed in various of these embodiments, as depicted in Fig. 3B, to prevent stray light causing erroneous outputs.

Figures 5A, 5B:
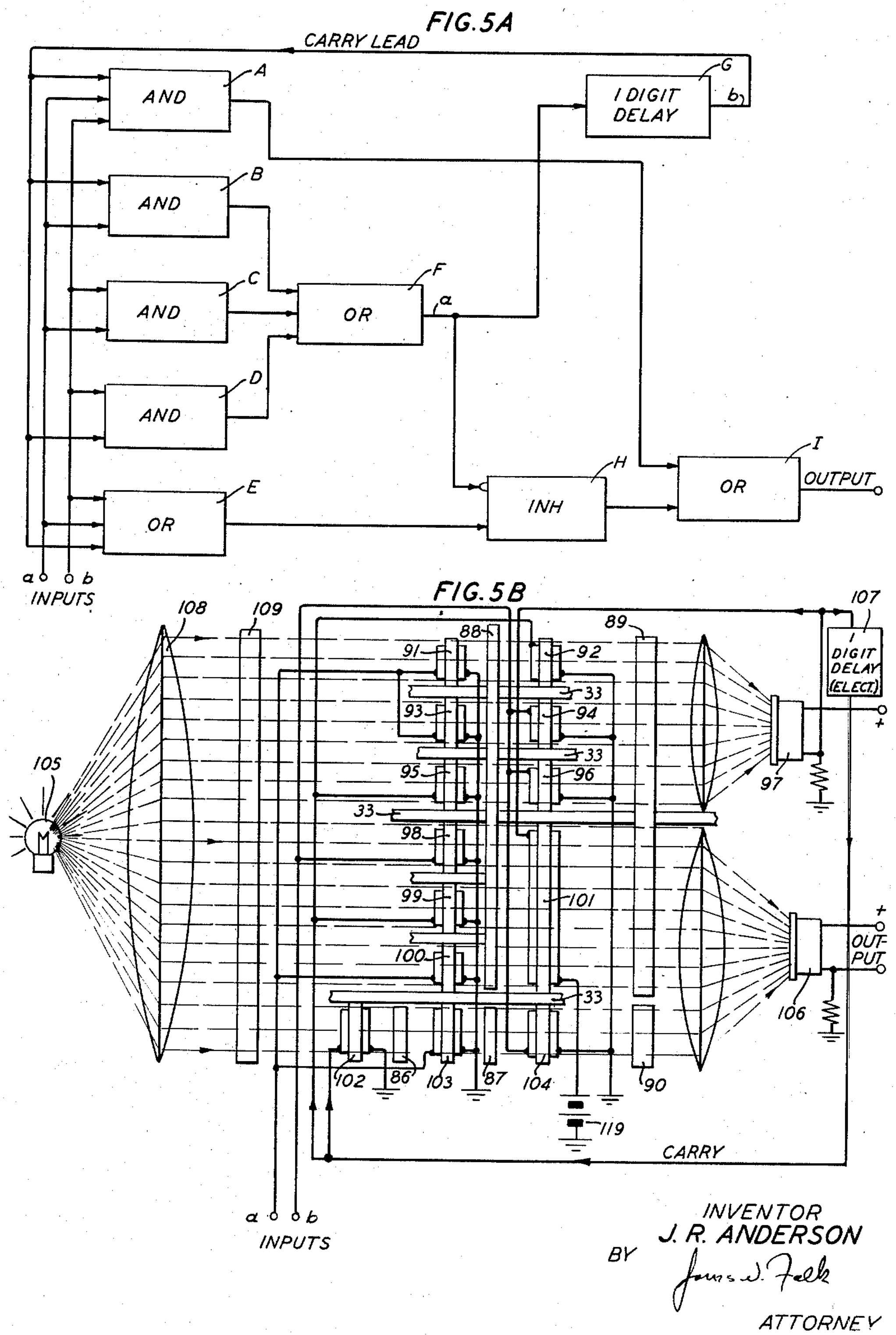
Fig. 5A is a block diagram of a Von Neuman type binary adder.
Figs. 5B and 5C are combined pictorial and schematic representations illustrative of specific embodiments of Von Neuman type binary adders in accordance with this invention.
Figures 5C, 6:
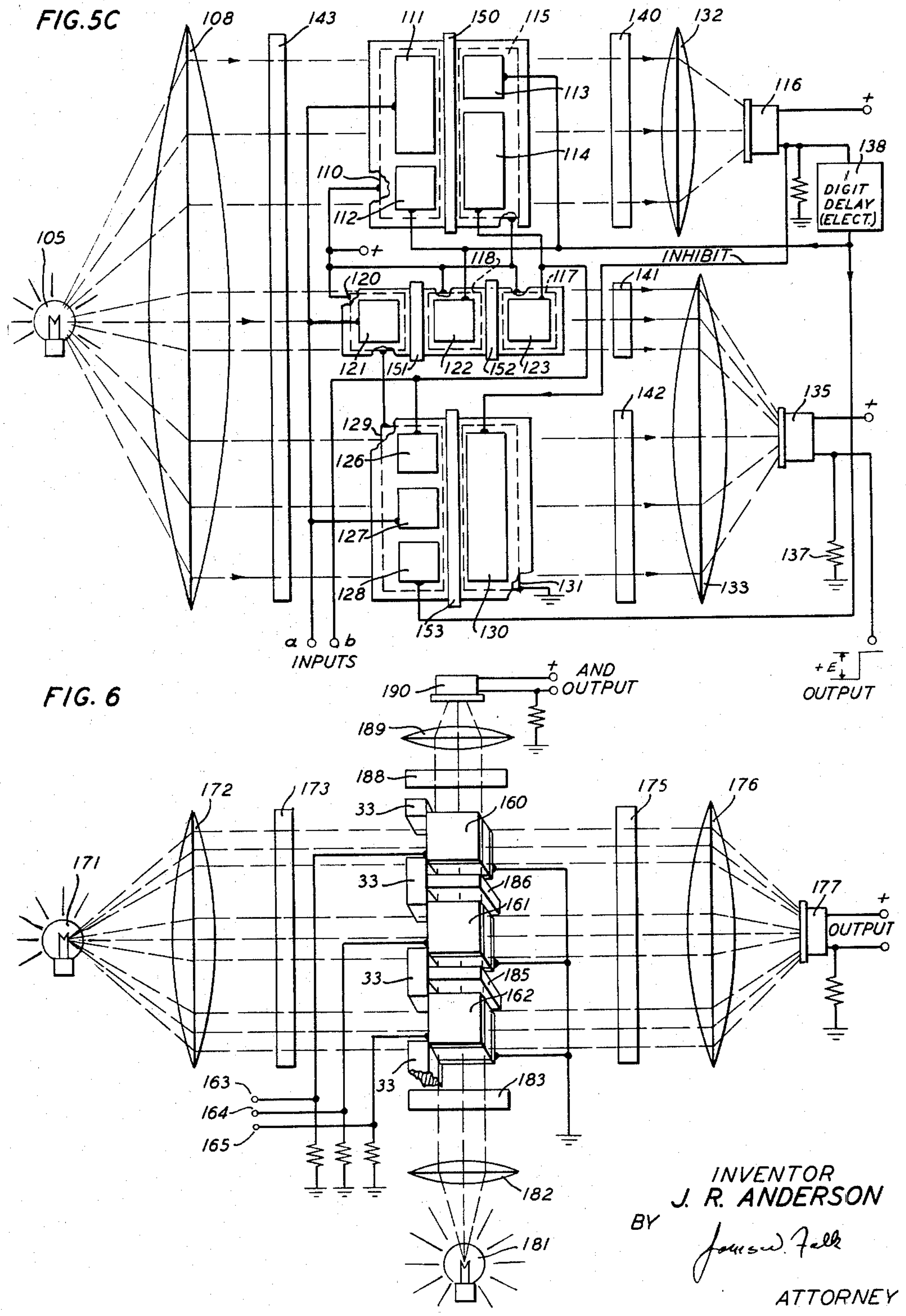
Fig. 6 is a combined pictorial and schematic representation of an AND logic and an OR logic system in accordance with this invention.

Fig. 5A depicts a block diagram of a Von Neuman type serial binary adder having two inputs and a single output. This adder uses four AND circuits, three OR circuits, a single INHIBIT circuit and a single one-digit delay circuit. Each of these blocks can be formed with the ferroelectric capacitors in a manner previously described. The one-digit delay circuit may include ferroelectric capacitors in a one-stage shift register of the type disclosed in my Patent No. 2,717,372, issued September 6, 1955. Light gate serial binary adders are shown in Figs. 5B and 5C. Fig. 5B depicts the binary adder comprised of light gates utilizing the principle of strain induced birefringence while Fig. 5C depicts another binary adder comprised of light gates which utilize the principle of the first transverse electro-optical effect. It is, of course, not necessary to limit such combination to those utilizing a single phenomenon as these circuits are "building blocks" which may be readily interchanged.

In Fig. 5B, light source 105 projects light upon the crystals of the binary adder in which ferroelectric capacitors 91 and 92 comprise a first AND circuit, capacitors 93 and 94 comprise a second AND circuit, capacitors 95 and 96 comprise a third AND circuit, light shields 33 being positioned between various of the capacitors. The above mentioned AND light gates correspond to the gates indicated in blocks B, C and D, respectively, in Fig. 5A. The light rotated by the first capacitor of any one of these three AND gates will pass through polarizer 88 and if the second capacitor of that AND gate also rotates the light, this light passes through analyzer 89. Since photocell 97 receives a signal from any one of these three AND circuits, the output signal derived from this photocell represents an OR gate output of the three AND circuits corresponding to the gate of block F of Fig. 5A. Ferroelectric capacitors 98, 99 and 100 comprise a three input OR circuit corresponding to the gate indicated in block E of Fig. 5A. In the path of the light beam subsequent to this OR circuit is an INHIBIT circuit including ferroelectric capacitor 101 corresponding to the gate indicated in block H of Fig. 5A. Ferroelectric capacitors 102, 103 and 104 comprise a three input AND circuit corresponding to the gate of block A of Fig. 5A, and the parallel combination of the three input AND circuit and the INHIBIT circuit are arranged with regard to the light beam reaching photocell 106 to constitute an OR circuit corresponding to the gate of block I of Fig. 5A. Polarizers 109 and 87 as well as analyzer 89 are oriented in one plane while polarizers 86 and 88 as well as analyzer 90 are oriented at 90 degrees with respect to this plane to assure proper operation of the light gate. Thus, it is seen that each of the blocks of Fig. 5 is represented in Fig. 5B as a combination of ferroelectric capacitors or the light beam transmitted through these capacitors with the exception of one-digit delay circuit 107 which might also comprise ferroelectric capacitors such as one stage of a shift register of the type mentioned above.

Fig. 5C depicts the binary adder of Fig. 5A in accordance with another illustrative embodiment of this invention. The ferroelectric capacitors defined by electrodes 110, 111, 112, 113, 114 and 115 and the included crystals depict the three AND gates represented by blocks B, C and D of Fig. 5A. The upper half of electrode 111, in cooperation with electrode 110, forms a first capacitor, which in combination with electrodes 113 and 115 of this second capacitor, comprises an AND gate. The lower half of electrode 111 cooperates with electrode 110 to form a gate which combines with the upper half of electrode 114 and its cooperating electrode 115 to form a second AND gate. Similarly, electrode 112 cooperates with electrode 110 to form a gate which cooperates with a gate formed by the lower half of electrode 114 and its cooperating electrode 115. Thus, the four capacitors are so arranged as to form three two-input AND gates. Photocell 116 is adapted to receive light passing through any one of these three AND gates and thus represents the OR gate indicated by block F of Fig. 5A. The ferroelectric capacitors defined by electrodes 120, 121, 118, 122, 117 and 123 and the included crystals depict the three input AND circuit indicated by block A in Fig. 5A. The ferroelectric capacitors defined by electrodes 126, 127, 128 and 129 and the included crystals depict the three OR gate represented by block E of Fig. 5A. The ferroelectric capacitors defined by electrodes 130 and 131 and the included crystals correspond to block H in Fig. 5A which depicts an INHIBIT circuit in block form since the light beam passing through any of the ferroelectric capacitors of the three input OR circuit also passes through the ferroelectric capacitor defining the INHIBIT circuit. As the light reaching photocell 135 may do so by passing through either the three input AND circuit described above or the three input OR circuit, the photocell effectively acts as the OR gate represented by block I of Fig. 5A. To insure proper operation of this binary adder, polarizers 143 and 152 as well as analyzers 140 and 142 are all oriented in the same plane while polarizers 150, 151 and 153 as well as analyzer 141 are all oriented at right angles with respect to this plane.

With reference to Figs. 5B and 5C, any combination of optical phenomena may be used in the separate logic circuits. However, the voltage requirements will be more uniform if a single optical phenomenon is employed such as shown in either of Figs. 5B or 5C. For optimum results in the previously mentioned logic systems, the first transverse electro-optical effect is employed.

Fig. 6 depicts another specific embodiment of this invention in which two or more ferroelectric capacitors are used simultaneously in two independent logic systems. One logic system is an AND logic system with regard to one beam of light incident upon each of the surfaces of the capacitors in series, and the same plurality of capacitors are utilized as an OR logic system with regard to another beam of light perpendicular to the first beam of light and incident upon the capacitors in parallel. Source 171 directs a beam of light through lens 172 and polarizer 173, which beam of light is incident upon the crystals of ferroelectric capacitors 160, 161 and 162, effectively in optical parallel arrangement with suitable light shields 33 between them. One electrode of each of ferroelectric capacitors 160, 161 and 162 is connected directly to ground while the cooperating electrode is connected to ground through a suitable resistor.

If a positive pulse is applied to one of input terminals 163, 164 or 165 of these ferroelectric capacitors, that light gate including the selected capacitor will rotate light causing this light to pass through analyzer 175 and lens 176 to photocell 177 thereby delivering the OR signal to terminal 179. A second source of light 181 is directed through lens 182 and polarizer 183 upon the edge of the crystal of ferroelectric capacitor 162. Since each of the light gates, including ferroelectric capacitors 160, 161 and 162, are in a normally opaque condition and are serially arranged with regard to the incident light from source 181, a pulse must be applied to each of these capacitors causing the series gate to rotate light through each of polarizers 185 and 186 to permit the light to pass through analyzer 188 and lens 189 to photocell 190. Polarizers 183 and 186 are oriented in the same plane while polarizer 185 and analyzer 188 are oriented 90 degrees with respect to this plane. Polarizer 173 is oriented 90 degrees with respect to analyzer 175. Utilizing this arrangement, it is apparent that two or more crystals may be utilized in two logic systems simultaneously to determine both an AND output and an OR output relative to the same electrical inputs. Since the two input beams are independent of each other and the two light detectors are independent, complete isolation is obtained between inputs and outputs.

It is to be understood that the above-described arrangements are illustrative of the application of the principles of the invention. Numerous other arrangements may be devised by those skilled in the art without departing from the spirit and scope of the invention.

What is claimed is:

1. An optical flip-flop system including a polarized light source, light detecting means, a first and a second crystal light gate interposed between said source and said detecting means in optical parallel arrangement, a third light gate arranged in optical series with said first and said second light gates between said optically parallel light gates and said detecting means, means for maintaining said third light gate in a normally transmitting condition, means for rendering said first light gate in a transmitting condition and means for feeding back a signal from said detecting means to said second light gate.

2. An electrical logic circuit comprising a source of polarized light, means for detecting polarized light, at least two light gates interposed between said light source and said light detecting means, said light gates each having a ferroelectric crystal and a pair of electrodes, means for applying a first potential continuously to one electrode of one of said gates to render said one gate normally transparent to said light, means for applying a different potential continuously to one electrode of the other of said gates to render said other gate normally opaque to said light, means for applying input signals selectively to the other electrodes of said gates to control the transmission of said light through said gates in accordance with the logical operation of the circuit, and output means connected to said light detecting means for receiving output electrical signals dependent on the selective application of said input signals to said other electrodes.

3. An electrical logic circuit in accordance with claim 2 wherein said electrodes are perpendicular to the axis of said light.

4. An electrical logic circuit in accordance with claim 2 wherein said electrodes are parallel to the axis of said light.

5. An electrical logic circuit comprising a source of polarized light, means for detecting polarized light, a pair of light gates including crystals having electrodes thereon serially positioned between said source and said detecting means, means applying reference potentials to one electrode of each of said gates, and means applying control potentials to the other electrode of each of said gates, said reference and control potentials determining the transmission of said light through said gates to said detecting means.

6. An electrical logic circuit in accordance with claim 5 wherein said means for applying reference potentials to one electrode of each of said gates includes means applying a first reference potential to one of said gates to render said one gate normally opaque to said light and means for applying a second reference potential to the other of said gates to render said other gate normally transparent to said light.

7. An electro-optical flip-flop circuit comprising a polarized light source, light detecting means, a first and a second crystal light gate positioned in parallel between said source and said detecting means, a third crystal light gate optically in series with said first and second gates and also between said source and said detecting means, means for maintaining said third gate normally transparent to said light, means for applying an input signal to said first gate to render it transparent to said light, means connected to the output of said detecting means for applying a signal to said second gate to render it transparent to said light, and means for applying a reset signal to said third gate to render it opaque to said light.

8. An electrical logic circuit in accordance with claim 5 further comprising a second source of polarized light and second means for detecting polarized light, said second source of polarized light and said second light detecting means being positioned on opposite sides of said pair of light gates so that light passes from said second light source to said second detecting means through each of said light gates in parallel and substantially perpendicular to the light from said first-mentioned source of polarized light.

References Cited in the file of this patent

UNITED STATES PATENTS

| | | |
|---|---|---|
| 1,792,752 | Michelssen | Feb. 17, 1931 |
| 2,467,325 | Mason | Apr. 12, 1949 |
| 2,600,962 | Billings | June 17, 1952 |
| 2,616,962 | Jaffe | Nov. 4, 1952 |
| 2,670,402 | Marks | Feb. 23, 1954 |
| 2,691,738 | Matthias | Oct. 12, 1954 |
| 2,693,907 | Tootill | Nov. 9, 1954 |
| 2,705,903 | Marshall | Apr. 12, 1955 |
| 2,741,758 | Cray | Apr. 10, 1956 |
| 2,742,632 | Whitely | Apr. 17, 1956 |
| 2,747,109 | Montner | May 22, 1956 |
| 2,753,763 | Haines | July 10, 1956 |
| 2,758,787 | Felker | Aug. 14, 1956 |
| 2,758,788 | Yaeger | Aug. 14, 1956 |
| 2,760,085 | Van Nice | Aug. 21, 1956 |
| 2,766,659 | Baerwald | Oct. 16, 1956 |
| 2,780,958 | Wiley | Feb. 12, 1957 |
| 2,788,710 | West | Apr. 16, 1957 |